United States Patent
Kita et al.

[11] Patent Number: 5,527,644
[45] Date of Patent: Jun. 18, 1996

[54] LAYER BUILT CELL

[75] Inventors: Fusaji Kita, Suita; Akira Kato, Toride; Tomohiro Harada; Akira Kawakami, both of Takatsuki, all of Japan

[73] Assignee: Hitachi Maxell, Ltd., Osaka, Japan

[21] Appl. No.: 388,817

[22] Filed: Feb. 15, 1995

[30]   Foreign Application Priority Data

Feb. 16, 1994   [JP]   Japan .................................. 6-042028

[51]   Int. Cl.⁶ ...................................... H02M 2/14
[52]   U.S. Cl. ...................... 429/247; 429/194; 429/196; 429/249; 429/250
[58]   Field of Search ..................... 429/247, 248, 429/249, 250, 194, 196, 197, 94

[56]   References Cited

U.S. PATENT DOCUMENTS 5,085,954   2/1992   Kita et al. .............................. 429/194
5,352,547   10/1994   Kita et al. .............................. 429/194
5,356,736   10/1994   Kita et al. .............................. 429/197

OTHER PUBLICATIONS

86–151965, Kentaro et al., Alkaline Storage Battery, Dec. 25, 1986.

*Primary Examiner*—Stephen Kalafut
*Assistant Examiner*—Richard H. Lilley, Jr.

[57]   ABSTRACT

A layer built cell with improved safety having at least one pair of positive and negative electrodes, an electrolytic solution and at least one separator which is present between the pair of electrodes. The separator has a liquid retention rate of at least 1.5 cc/g, the retention rate having been measured relative to retention of propylene carbonate.

19 Claims, 1 Drawing Sheet

LAYER BUILT CELL

BACKGROUND OF THE INVENTION

1. Field of the Invention

The present invention relates to a layer built cell comprising electrodes and an electrolytic solution. In particular, the present invention relates to a layer built cell with improved safety.

2. Description of the Related Art

A layer built cell comprising lithium as a negative electrode active material, manganese dioxide as a positive electrode active material and an organic solvent electrolytic solution, a typical example of which is a lithium-manganese dioxide cell, is increasingly used, since it has a high energy density, a light weight and a long life.

Recently, attentions are paid on the use of a layer built cell comprising an organic electrolytic solution as a secondary cell, and such cell is commercially sold as a lithium ion cell. The lithium ion cell uses $LiCoO_2$ as a positive electrode and a carbon compound as a negative electrode and can generate a high voltage.

With the increase of a cell density and improvement of discharge characteristics of such cell, the cell tends to lose its safety. With the increase of the density, the electrolytic solution may not be sufficiently penetrated in the entire volume of the cell.

SUMMARY OF THE INVENTION

An object of the present invention is to provide a layer built cell having improved safety while maintaining or increasing other properties of the cell.

According to a first aspect of the present invention, there is provided a layer built cell comprising at least one pair of positive and negative electrodes, an electrolytic solution and at least one separator which is present between said pair of electrodes, wherein said separator has a liquid retention rate of at least 1.5 cc/g, and an amount of said electrolytic solution per unit internal volume of said cell is at least 0.2 cc/cc and less than 0.4 cc/cc.

According to a second aspect of the present invention, there is provided a layer built cell comprising at least one pair of positive and negative electrodes, an electrolytic solution and at least one separator which is present between said pair of electrodes, wherein said separator has, on its surface, a ratio of oxygen atoms to carbon atoms (O/C) of at least 8 atomic %, and an amount of said electrolytic solution per unit internal volume of said cell is at least 0.2 cc/cc and less than 0.4 cc/cc.

According to a third aspect of the present invention, there is provided a high density layer built cell comprising at least one pair of positive and negative electrodes, an electrolytic solution and at least one separator which is present between said pair of electrodes, wherein (1) a peripheral length of an electrode facing other electrode per unit volume of said cell is at least 15 cm/cc, (2) said separator has a liquid retention rate of at least 1.5 cc/g, (3) said separator has, on its surface, a ratio of oxygen atoms to carbon atoms (O/C) of at least 8 atomic %, (4) said separator has a SD temperature of not higher than 140° C., (5) a ratio of a peripheral length of an electrode facing other electrode per unit volume of said cell to a total thickness of positive and negative electrodes is at least 260 $cc^{-1}$, (6) the number of laminations of said pair of electrodes is at least 10, (7) a negative electrode has a liquid retention rate of at least 0.8, (8) a positive electrode has a liquid retention rate of at least 0.8, (9) an average viscosity of a solvent of said electrolytic solution is at least 1 cp, and

(10) an amount of said electrolytic solution per unit internal volume of said cell is at least 0.2 cc/cc and less than 0.4 cc/cc.

BRIEF DESCRIPTION OF THE DRAWING

The FIGURE shows a schematic cross sectional view of a layer built cell according to the present invention.

DETAILED DESCRIPTION OF THE INVENTION

Figure 1:
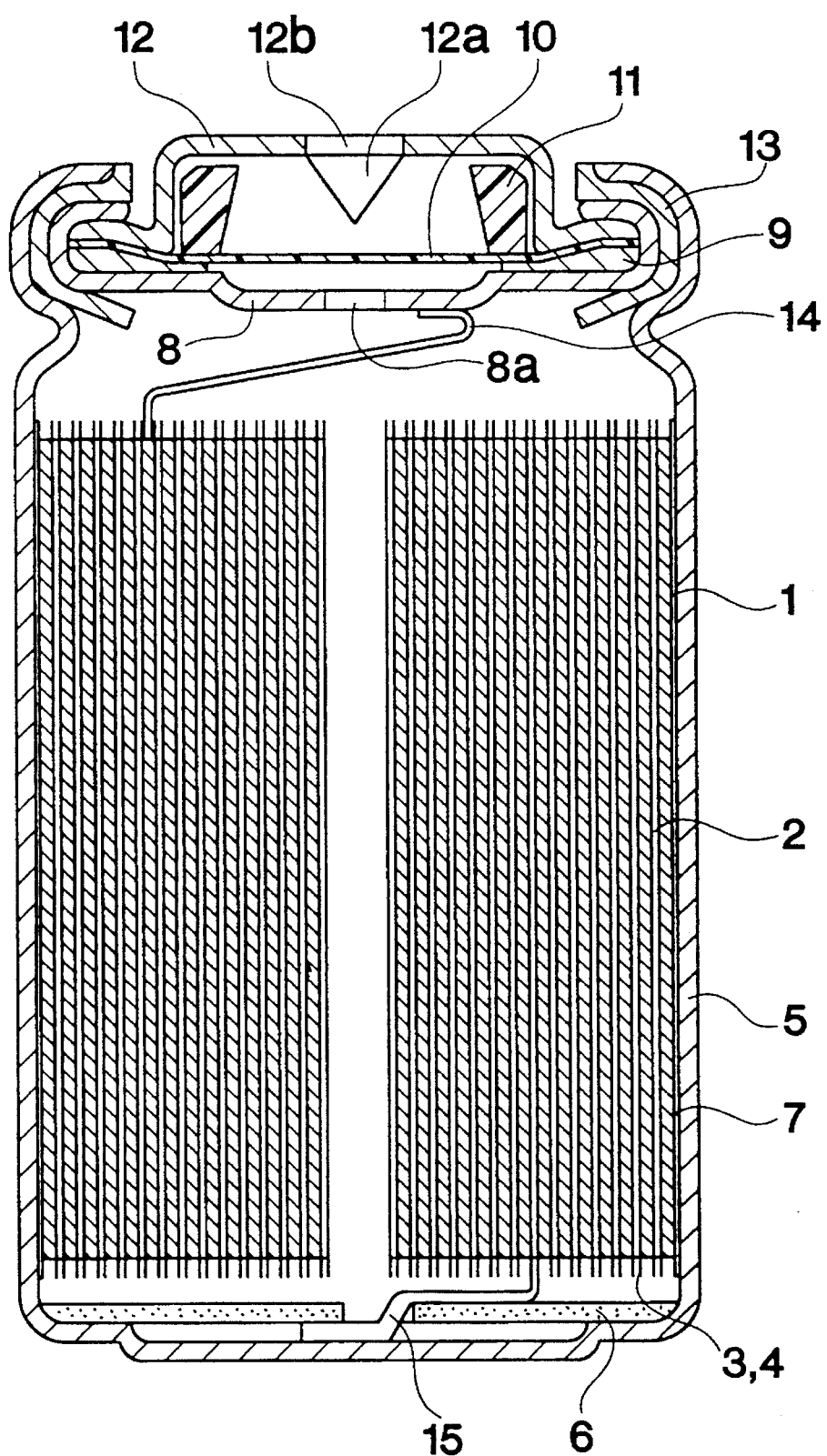

In the present invention, a layer built cell comprises plural pairs of electrodes each comprising a set of a positive electrode, a separator, a negative electrode and a separator, or at least one pair of electrodes comprising a positive electrode, a separator and a negative electrode which is in a wound form.

For example, the cell has a structure represented by (+)/S/(−)/S/(+)/S/(−) or (+)M(+)/S/(−)M'(−)/S/(+)M(+)/S/(−)M'(−).

wherein (+) is a positive electrode, (−) is a negative electrode, S is a separator, and each of M and M' is a collector metal.

A peripheral length of an electrode facing other electrode means a length of all peripheries of an electrode which faces other electrode through a separator. For example, when a negative electrode faces a positive electrode having the same size or a larger size, the peripheral length of an electrode facing other electrode is the peripheral length of the negative electrode. When one negative electrode is sandwiched by a pair of positive electrodes through respective separators, the peripheral length of an electrode facing other electrode is twice the peripheral length of the negative electrode.

As the internal volume of the cell increases, the sizes of the electrodes are made large and then the peripheral length of the electrode facing other electrode increases. But, since the peripheral length of the electrode facing other electrode per unit volume of the cell does not change materially, this factor is an effective criterion for expressing a degree of densification of the internal cell structure.

The reason why the peripheral length of the electrode facing other electrode per unit cell internal volume is used as such criteria will be explained.

In the course of development of a cell having a high density and excellent properties, a cell having excellent properties that it could be discharged at a high current was produced. However, when a safety of such cell was evaluated, it was found that a cell having better properties tended to have less safety in the case of overdischarge or overcharge.

A cause for decreased safety was further investigated, and it was found that, in the case of abnormal conditions such as overdischarge or overcharge, metal ions in the electrolytic solution were reduced to a metal and deposited on an electrode, and the deposited metal grew and reached an opposite electrode to form a short circuit, whereby abnormal phenomena such as abnormal heating or smoking were caused. Further, it was found that such internal short circuit was formed largely at a peripheral part of the electrode.

Accordingly, as the peripheral length of the electrode per unit cell internal volume increases, a degree of danger of the cell increases. According to the investigation, when the peripheral length of the electrode per unit cell internal volume exceeded 15 cm/cc, some cells started to generate abnormal heat in the case of overdischarge or overcharge. When the peripheral length of the electrode per unit cell internal volume exceeded 17 cm/cc, in particular, 20 cm/cc, the degree of danger of cell further increased.

According to the present invention, the above problem can be solved by the use of a separator having a high liquid retention rate. According to the results of the investigation, when the liquid retention rate of the separator is at least 1.5 cc/g, the safety of the cell increases. The liquid retention rate of the separator is preferably at least 3.0 cc/g, more preferably at least 4.5 cc/g.

The liquid retention rate of the separator is measured as follows:

The separator is removed from the cell and cut to a size of 2 cm×5 cm, and the cut piece of the separator is dipped in propylene carbonate and pulled up. After 5 seconds, a weight ($W_1$) of the cut piece with propylene carbonate is measured. After washing with acetone and drying at 80° C. for 2 hours, a weight ($W_2$) of the cut piece only is measured. Then, a ratio of $(W_1-W_2)/(d\times W_2)$ (cc/g) wherein d is a specific gravity of propylene carbonate (1.2 g/cc at 25° C.). The above measurement is repeated at least 5 times, and the obtained ratios are averaged and used as the liquid retention rate of the separator.

The liquid retention rate of the separator is influenced by a structure of the separator, lipophilicity on the surface of the separator, and the like. To improve the liquid retention rate of the separator by the lipophilicity of its surface, an atomic ratio of oxygen to carbon (O/C ratio) on the surface of the separator is preferably made large. Preferably, the O/C ratio is at least 0.08 (8 atomic %), more preferably at least 0.15 (15 atomic %). Probably, the O/C ratio may relate to a ratio of an amount of a lipophilic group such as —CO—O—, —CO—, —COH, —SO$_2$—, etc. to an amount of the carbon atoms in a microporous film of a polyolefin which is used as a base film of the separator.

Then, the above lipophilic group is preferably introduced on the surface of the separator. When the lipophilicity is imparted to the separator surface by the addition of a surfactant or a hydrophilic polymer, the surfactant or the hydrophilic polymer is used in an amount larger than a required amount since it is dissolved or dropped off in the electrolytic solution, so that the O/C ratio becomes smaller than the initial ratio and then the liquid retention ability of the separator is deteriorated.

The O/C ratio is calculated as follows:

The separator is removed from the cell and washed with acetone. After drying it at 50° C. for 2 hours, the separator was kept standing at room temperature (20° C.) and 60% RH for one day, and peak intensities corresponding to oxygen and carbon are measured by X-ray photoelectron spectroscopy (XPS). From the peak intensities, the O/C ratio is calculated.

For further improvement of the safety of the cell, an amount of the electrolytic solution is adjusted adequately. That is, an amount of the electrolytic solution per unit cell internal volume is preferably at least 0.2 cc/cc and less than 0.4 cc/cc, more preferably at least 0.2 cc/cc and less than 0.25 cc/cc. When this amount is at least 0.2 cc/cc, the cell properties reach certain levels. When this amount is less than 0.4 cc/cc, an amount of the electrolytic solution which is present in a free state is decreased and the cell safety is improved.

As the peripheral length of the electrode facing other electrode per unit cell internal volume increases and the total thickness of the positive and negative electrodes is small, the cell safety is deteriorated and therefore the effect of the present invention is remarkable with the cell having such features. Then, the increase of the cell safety by the present invention is remarkable when a ratio of the peripheral length of the electrode facing other electrode per unit cell internal volume cell to the total thickness of positive and negative electrodes is preferably at least 260 cc$^{-1}$, more preferably at least 500 cc$^{-1}$, most preferably at least 700 cc$^{-1}$.

When the number of laminations of the pair of electrodes is at least 10, preferably at least 15, generated heat is accumulated when the short circuit is formed in the cell. Then the present invention is advantageous for the cell having the above number of laminations of the pair of electrodes.

In addition, the present invention is advantageously employed in the cell using, as the electrolytic solution, a flammable organic electrolytic solution, since the electrolytic solution is ignited and damage is expanded when the cell is under abnormal conditions to function a vent.

A SD (Shut Down) temperature is important for the cell safety. In the present invention, the SD temperature is defined as a temperature at which a resistance of the separator in the electrolytic solution is increased to at least 10 times a resistance at room temperature (25° C.). When the SD temperature is 140° C. or lower, the separator is quickly clogged when the cell is heated, then ions hardly pass through the separator and, in turn, an electric current passing through the separator is decreased, whereby the cell is not heated to a high temperature.

When the present invention is applied to an organic electrolytic solution cell, while LiClO$_4$, LiPF$_6$, LiBF$_4$ or LiAsF$_6$ may be used as an electrolyte, it is preferred to use a salt of an alkali metal or an alkaline earth metal comprising a —SO$_2$— bond or a —CO— bond and a fluoroalkyl group as the electrolyte. To achieve a high conductivity, the fluoroalkyl group has preferably 1 to 8 carbon atoms, more preferably 2 to 6 carbon atoms.

Preferred examples of such salt to be used as the electrolyte are LiC$_2$F$_5$SO$_3$, LiC$_3$F$_7$SO$_3$, LiC$_4$F$_9$SO$_3$, (CF$_3$SO$_2$)$_3$NLi, (CF$_3$SO$_2$)$_3$CLi, and the like.

Examples of a solvent of the electrolytic solution are esters (e.g. propylene carbonate, ethylene carbonate, butylene carbonate, γ-butyrolactone, γ-valerolactone, etc.), sulfur compounds (e.g. sulfolane, dimethylsulfoxide, etc.), ethers (e.g. 1,2-dimethoxyethane, dimethoxymethane, dimethoxypropane, 1,3-dioxolane, tetrahydrofuran, 2-methyltetrahydrofuran, etc.) and the like. These solvent may be used independently or as a mixture of two or more of them.

Among them, a solvent containing a large percentage of the ester, in particular, carbonate such as ethylene carbonate is more preferred since the separator is less wet and the effect of the high liquid retention rate is remarkably achieved. A percentage of the ester, in particular the carbonate in the solvent is preferably at least 50% by weight, more preferably at least 80% by weight, most preferably at least 90% by weight.

Preferably, the solvent has a high average viscosity, since again the separator is less wet and the effect of the high liquid retention rate is remarkably achieved. The average viscosity of the mixed solvent is expressed by the formula:

$$\Sigma(\eta_i \times v_i)/100$$

wherein $\eta_i$ is a viscosity of a solvent (i) and $v_i$ is a percentage by volume of the solvent (i).

For example, an average viscosity of a mixture of ethylene carbonate (EC) and methylethyl carbonate (MEC) of a volume ratio of 1:1 is $(\eta_{EC} \times 50 + \eta_{MEC} \times 50)/100$, which is equal to 1.3 cp.

Preferably, the average viscosity of the solvent is at least 1 cp, more preferably at least 1.3 cp, most preferably at least 1.5 cp.

The negative electrode comprises an alkali metal, an alkaline metal, an alloy of such metal (e.g. Li-Al, Li-ln, etc.), a carbon compound such as graphite in which lithium is intercalated.

The liquid retention rate of the negative electrode is also important in the present invention. For the improvement of the cell safety, this liquid retention rate is preferably at least 0.8, more preferably at least 1.1, most preferably at least 1.4.

The liquid retention rate of the negative electrode is measured as follows:

The negative electrode is removed, in a dry atmosphere, from the cell which has been discharged and cut to a size of 2 cm×5 cm. Then, the cut piece of the negative electrode is dipped in propylene carbonate for 3 hours and pulled up. After 5 seconds, a weight ($WA_1$) of the cut piece with propylene carbonate is measured. The cut piece is then washed with dimethyl carbonate, dipped in dimethyl carbonate for 3 hours and wiped, followed by drying at 100° C. under reduced pressure for 5 hours. A weight ($WA_2$) of the cut piece of the negative electrode only is measured. After measuring a thickness of the negative electrode, a weight of a collector (WAC) is deducted from the whole weight of the cut piece, and a density (DA) of the negative electrode except the collector is calculated. Then, a ratio of $[(WA_1-WA_2)/d]/[(WA_2-WAC)/DA]$ (dimensionless) wherein d is a specific gravity of propylene carbonate (1.2 g/cc at 25° C.) is calculated. The above measurement is repeated at least 5 time, and the obtained values are averaged.

Since the liquid retention rate of the negative or positive electrode varies with the material of the electrode, it is expressed as a value per unit volume of the electrode active material.

The positive electrode comprises an active material (e.g. manganese oxide, vanadium oxide, chromium oxide, lithium-cobalt oxide, lithium-nickel oxide, etc.), an electric conductive aid and a binder. The mixture of these materials is molded together with a collector made of, for example, stainless steel.

In the present invention, the positive electrode preferably has a large liquid retention rate. For the improvement of the cell safety, it is preferably at least 0.5, more preferably at least 0.8, most preferably at least 1.0.

This liquid retention rate of the positive electrode can be measured in the similar way to the measurement of the liquid retention rate of the negative electrode. That is, the positive electrode is removed from the cell which has been discharged and cut to a size of 2 cm×5 cm. Then, the cut piece of the positive electrode is dipped in propylene carbonate for 3 hours and pulled up. After 5 seconds, a weight ($WC_1$) of the cut piece with propylene carbonate is measured. The cut piece is then washed with dimethyl carbonate, dipped in dimethyl carbonate for 3 hours and wiped, followed by drying at 100° C. under reduced pressure for 5 hours. A weight ($WC_2$) of the cut piece of the positive electrode only is measured. After measuring a thickness of the negative electrode, a weight of a collector (WCC) is deducted from the whole weight of the cut piece, and a density (DC) of the positive electrode material mixture is calculated. Then, a ratio of $[(WC_1-WC_2)/d]/[(WC_2-WCC)/DC]$ (dimensionless) wherein d is a specific gravity of propylene carbonate (1.2 g/cc at 25° C.) is calculated. The above measurement is repeated at least 5 time, and the obtained values are averaged.

PREFERRED EMBODIMENTS OF THE INVENTION

The present invention will be illustrated by the following Examples, which do not limit the scope of the present invention in any way.

Example 1

A mixture of thermally treated manganese oxide (90 parts by weight), carbon black (5 parts by weight) and polytetrafluoroethylene (5 parts by weight) was molded in a tape form around a core made of a stainless steel net to produce a positive electrode having a thickness of 0.2 mm, a width of 30 mm and a length of 340 mm. To the tape form positive electrode, a stainless steel collector was attached and dried at 200° C., followed by cooling to room temperature in a dry atmosphere.

On the tape form positive electrode, a tape form negative electrode made of metal lithium having a thickness of 0.10 mm, a width of 30 mm and a length of 320 mm was laminated with inserting therebetween microporous polyethylene film separators each having a thickness of 25 μm (a O/C. ratio=0.2, a SD temperature=135° C.).

The laminated electrodes were wound to form a wound electrode pair (the number of turns of the electrode pairs=14 turns, corresponding to the number of laminations of the electrode pairs in a radius of the cell=14) and inserted in a cylindrical cell case with a bottom having an outer diameter of 15 mm. To each electrode, a respective lead wire was spot welded.

In the cell case, an electrolytic solution having a composition of 0.6M $(CF_3SO_2)_2NLi/PC:DME$ (1:2) (1.5 ml) was poured. The mixed solvent of this solution had an average viscosity of 1.1 cp.

The electrolytic solution composition "0.6M $(CF_3SO_2)_2NLi/PC:DME$ (1:2)" means that 0.6 mol/l of $(CF_3SO_2)_2NLi$ is dissolved in a mixed solvent of propylene carbonate (PC) and 2-dimethoxyethane (DME) in a volume ratio of 1:2.

An opening of the cell case was sealed by a conventional method to obtain a cylindrical high density layer built cell.

After aging at 60° C. for 16 hours in a dry atmosphere of argon, a liquid retention rate of the separator was measured to be 5 cc/g.

A peripheral length of the electrode facing other electrode per unit cell internal volume was 22 cm/cc, a ratio of the peripheral length of the electrode facing other electrode per unit cell internal volume to the total thickness of the electrode pair was 740 $cc^{-1}$, an amount of the electrolytic solution per unit cell internal volume was 0.24 cc/cc.

The liquid retention rates of the negative and positive electrodes were 1.2 and 0.8, respectively.

The FIGURE schematically shows a cross section of the layer built cell according to the present invention, which comprises a positive electrode 1 made of, for example, the above manganese oxide mixture, a negative electrode 2 made of, for example, lithium, a separator 3, an electrolytic solution 4, a cell case 5, an insulator 6, a sealing plate 8, a terminal plate 12, an insulating packing 13 and lead wires 14 and 15.

In the above cell, the negative electrode 2 is formed by pressing a lithium plate on a stainless steel net.

In the FIGURE, stainless steel nets used for forming the negative and positive electrodes, collectors and so on are not shown for clarity.

The cell case 5 functions also as a negative electrode terminal. At the bottom of the cell case 5, an insulator 6 made of, for example, a polytetrafluoroethylene sheet is placed. The cell case 5 contains all the essential components of the cell such as the wound electrodes comprising the positive electrode 1, the negative electrode 2 and the separator 3, the electrolytic solution 4, and so on. Around the wound electrodes, an insulating tape 7 is provided.

The sealing plate 8 had an gas venting hole 8a at its center, and further an annular packing 9 made of, for example, polypropylene, a flexible thin plate 10 made of, for example, titanium, and an annular thermally deformable member 11 made of, for example, polypropylene. A breaking pressure on the flexible thin plate 10 can be changed by the thermal deformation of the member 11 caused by the temperature change.

The lead member 14, which connects the positive electrode 1 and the sealing plate 8, is made of, for example, a nickel-plated press steel, and has a cut blade 12a and a gas vent 12b. When a gas is generated in the cell and an internal pressure of the cell increases, the flexible thin plate 10 is deformed by the increased pressure, whereby the flexible thin plate is cut by the cut blade 12a, and the gas in the cell is evacuated outside through the gas vent 12b.

The lead wire 12 electrically connects the positive electrode 1 and the sealing plate 8, and the terminal plate 12 functions as the positive electrode terminal.

The lead wire 15 electrically connects the negative electrode 2 and the cell case 5.

Example 2

In the same manner as in Example 1 except that an amount of the electrolytic solution per unit cell internal volume was changed to 0.20 cc/cc, a cylindrical layer built cell was assembled.

Comparative Example 1

In the same manner as in Example 1 except that a conventional polyethylene separator was used as the separator, a cylindrical high density layer built cell was assembled. This polyethylene separator had a thickness of 25 μm, a O/C ratio of 0.05, a SD temperature of 135° C. and a liquid retention rate of 1.4. The liquid retention rates of the negative and positive electrodes were 1.2 and 0.8, respectively. An amount of the electrolytic solution per unit cell internal volume was about 0.24 cc/cc.

Comparative Example 2

In the same manner as in Example 1 except that a conventional polypropylene separator was used as the separator, a cylindrical high density layer built cell was assembled. This polypropylene separator had a thickness of 25 μm, a O/C ratio of 0.02, a SD temperature of 162° C. and a liquid retention rate of 1.0. An amount of the electrolytic solution per unit cell internal volume was 0.24 cc/cc.

Comparative Example 3

In the same manner as in Example 1 except that sizes of the positive electrode were changed to a thickness of 0.2 mm, a width of 20 mm and a length of 340 mm, and sizes of the negative electrode were changed to a thickness of 0.1 mm, a width of 20 mm and a length of 320 mm, a cylindrical high density layer built cell was assembled. In this cell, a peripheral length of the electrode facing other electrode per unit cell internal volume was 21 cm/cc, and a ratio of the peripheral length of the electrode facing other electrode per unit cell internal volume to the total thickness of the electrode pair was 710 $cc^{-1}$. An amount of the electrolytic solution per unit cell internal volume was about 0.4 cc/cc.

Comparative Example 4

In the same manner as in Example 1 except that sizes of the positive electrode were changed to a thickness of 0.4 mm, a width of 30 mm and a length of 200 mm, sizes of the negative electrode were changed to a thickness of 0.18 mm, a width of 30 mm and a length of 190 mm and the number of turns of would electrode pair was 4, that is the number of laminations of the electrode pair was 8, a cylindrical high density layer built cell was assembled. In this cell, a peripheral length of the electrode facing other electrode per unit cell internal volume was 14 cm/cc, and a ratio of the peripheral length of the electrode facing other electrode per unit cell internal volume to the total thickness of the electrode pair was 240 $cc^{-1}$. The liquid retention rate of the separator was 1.0 cc/g. The liquid retention rates of the negative and positive electrodes were 0.7 and 0.5, respectively.

Example 3

A mixture of $LiCoO_2$ (91 parts by weight), graphite (6 parts by weight) and polyvinylidene fluoride (3 parts by weight) in N-methylpyrrolidone was coated on an aluminum foil, dried and calendered in a tape form to produce a positive electrode having a thickness of 0.16 mm, a width of 30 mm and a length of 340 mm. To the tape form positive electrode, an aluminum collector was attached and dried at 150° C. under reduced pressure, followed by cooling to room temperature in a dry atmosphere.

Separately, a mixture of graphite carbon (90 parts by weight) and polyvinylidene fluoride (10 parts by weight) in N-methylpyrrolidone was coated on a copper foil, dried and calendered in a tape form to produce a negative electrode having a thickness of 0.14 mm, a width of 30 mm and a length of 320 mm. To the tape form negative electrode, a nickel collector was attached and dried at 150° C. under reduced pressure, followed by cooling to room temperature in a dry atmosphere.

The tape form positive and negative electrodes were laminated and wound with inserting respective separators each made of a microporous polyethylene film having a thickness of 25 μm (a O/C ratio=0.2, a SD temperature of 135° C.) to form a wound electrode pair (the number of turns of the wound electrode pair=14) and inserted in a cylindrical cell case with a bottom having an outer diameter of 15 mm. To the negative electrode, a lead wire was spot welded, and to the positive electrode, a lead wire was ultrasonic welded.

In the cell case, an electrolytic solution having a composition of 1.0M LiPF$_6$/EC:MEC. (1:1) (1.5 ml) was poured. The mixed solvent of this solution had an average viscosity of 1.3 cp.

The electrolytic solution composition "1.0M LiPF$_6$/EC:MEC (1:1)" means that 1.0 mol/l of LiPF$_6$ is dissolved in a mixed solvent of ethylene carbonate (EC) and methylethyl carbonate (MEC) in a volume ratio of 1:1.

An opening of the cell case was sealed by a conventional method to obtain a cylindrical high density layer built cell.

A liquid retention rate of the separator was measured to be 5 cc/g.

A peripheral length of the electrode facing other electrode per unit cell internal volume was 22 cm/cc, a ratio of the peripheral length of the electrode facing other electrode per unit cell internal volume to the total thickness of the electrode pair was 740 cc$^{-1}$, an amount of the electrolytic solution per unit cell internal volume was 0.24 cc/cc.

The liquid retention rates of the negative and positive electrodes were 1.2 and 1.5, respectively.

Example 4

In the same manner as in Example 2 except that a kind of the negative electrode was changed from the carbon electrode to a lithium electrode having the same size, a cylindrical high density layer built cell was assembled. In this cell, a peripheral length of the electrode facing other electrode per unit cell internal volume was 22 cm/cc, a ratio of the peripheral length of the electrode facing other electrode per unit cell internal volume to the total thickness of the electrode pair was 740 cc$^{-1}$ an amount of the electrolytic solution per unit cell internal volume was 0.40 cc/cc, and liquid retention rates of the positive and negative electrodes were 1.2 and 1.2, respectively.

Example 5

In the same manner as in Example 3 except that an amount of the electrolytic solution per unit cell internal volume was changed to 0.30 cc/cc, a cylindrical layer built cell was assembled.

Comparative Example 5

In the same manner as in Example 3 except that an amount of the electrolytic solution per unit cell internal volume was changed to 0.1 cc/cc, a cylindrical layer built cell was assembled. A liquid retention rate of the separator was 5 cc/cc, a peripheral length of the electrode facing to other electrode per unit cell internal volume was 22 cm/cc, a ratio of the peripheral length of the electrode facing to other electrode per unit cell internal volume to the total thickness of the positive and negative electrodes was 740 cc$^{-1}$ and electrolytic solution per unit cell internal volume was 0.40 cc/cc, and liquid retention rates of the positive and negative electrodes were 1.2 and 1.2, respectively.

With each of the cells assembled in Examples 1 and 2 and Comparative Examples 1–4, a safety test was carried out. That is, each cell was discharged to −3 V at 10 A and kept at a constant voltage of −3 V after reaching −3 V. After one hour from the start of keeping the voltage at −3 V, abnormal heat generation in the cell or smoking was checked.

Separately, each cell was discharged at 3 A for 0.5 second and the lowest voltage was measured.

The results are shown in Table 1.

TABLE 1

| Example No. | Safety | OCV*[1] (V) | CCV*[2] (V) |
|---|---|---|---|
| Example 1 | No abnormality | 3.2 | 2.6 |
| Example 2 | ↑ | 3.2 | 2.5 |
| Comp. Ex. 1 | Ignited | 3.2 | 2.5 |
| Comp. Ex. 2 | Ignited | 3.2 | 2.5 |
| Comp. Ex. 3 | Ignited | 3.2 | 2.2 |
| Comp. Ex. 4 | No abnormality | 3.2 | 2.1 |

Note: *[1]OCV = Open current voltage.
CCV = Closed current voltage.

The cells of Examples 1 and 2 comprising the separator which had the excellent liquid retention rate had the better safety and cell properties than the cells of Comparative Examples 1 and 4.

The cell of Comparative Example 3, which contained a large amount of the electrolytic solution per unit cell internal volume, had insufficient safety.

The cell of Comparative Example 4 had sufficient safety but had inferior cell properties.

Each of the cells of Examples 3 and 5 and Comparative Example 5 was charged up to 4.2 V at 500 mA, and then at a constant voltage of 4.2 V after reaching 4.2 V. The total charging time was 2.5 hours.

Then the cell was subjected to the same safety test as above, and the results are shown in Table 2.

No cell was ignited, but the cell of Example 4 had slightly less current stability than that of Example 3. In addition, the cell of Example 2 had a shorter liquid pouring time than those of Examples 4 and 5.

The cell of Comparative Example 5 had good safety, but poor cell properties.

TABLE 2

| Example No. | Safety | OCV (V) | CCV (V) | Liquid pouring time (hrs) |
|---|---|---|---|---|
| Example 3 | No abnormality | 4.2 | 3.6 | 0.5 |
| Example 4 | ↑ | 4.2 | 3.6 | 0.7 |
| Example 5 | ↑ | 4.2 | 3.6 | 1.0 |
| Comp. Ex. 5 | ↑ | 4.2 | <0 | 0.1 |

What is claimed is:

1. A layer built cell comprising:
   at least one pair of positive and negative electrodes,
   an electrolytic solution, and
   at least one separator which is present between said pair of electrodes,
   wherein said separator has a liquid retention rate of at least 1.5 cc/g, the retention rate having been measured relative to retention of propylene carbonate, and
   wherein an amount of said electrolytic solution per unit internal volume of said cell is at least 0.2 cc/cc and less than 0.4 cc/cc.

2. The layer built cell according to claim 1, wherein a peripheral length of an electrode facing other electrode per unit internal volume of said cell is at least 15 cm/cc.

3. The layer built cell according to claim 1, wherein a solvent of said electrolytic solution has an average viscosity of at least 1.0 cp.

4. The layer built cell according to claim 1, wherein a ratio of a peripheral length of an electrode facing other electrode per unit internal volume of said cell to a total thickness of said electrodes is at least 260 cc$^{-1}$.

5. The layer built cell according to claim 1, wherein the number of laminations of said pair of electrodes is at least 10.

6. The layer built cell according to claim 1, wherein said electrolytic solution is a flammable organic electrolytic solution.

7. The layer built cell according to claim 1, wherein said separator has, on its surface, a ratio of oxygen atoms to carbon atoms of at least 8 atomic %, the ratio having been measured after the separator was washed with acetone.

8. The layer built cell according to claim 1, wherein said separator has a SD temperature of not higher than 140° C.

9. The layer built cell according to claim 1, wherein said negative electrode has a liquid retention rate of at least 0.8, the retention rate of the negative electrode having been measured relative to retention of propylene carbonate and dimethyl carbonate.

10. The layer built cell according to claim 1, wherein said positive electrode has a liquid retention rate of at least 0.5, the retention rate of the positive electrode having been measured relative to the retention of propylene carbonate and dimethyl carbonate.

11. A layer built cell comprising:

at least one pair of positive and negative electrodes, an electrolytic solution, and at least one separator which is present between said pair of electrodes, wherein said separator has, on its surface, a ratio of oxygen atoms to carbon atoms (O/C) of at least 8 atomic %, the ratio having been measured after the separator was washed with acetone, and wherein an amount of said electrolytic solution per unit internal volume of said cell is at least 0.2 cc/cc and less than 0.4 cc/cc.

12. A high density layer built cell comprising at least one pair of positive and negative electrodes, an electrolytic solution and at least one separator which is present between said pair of electrodes, wherein (1) a peripheral length of an electrode facing other electrode per unit volume of said cell is at least 15 cm/cc, (2) said separator has a liquid retention rate of at least 1.5 cc/g, the retention rate of the separator having been measured relative to retention of propylene carbonate, (3) said separator has, on its surface, a ratio of oxygen atoms to carbon atoms (O/C) of at least 8 atomic %, the ratio having been measured after the separator was washed with acetone, (4) said separator has a SD temperature of not higher than 140° C., (5) a ratio of a peripheral length of an electrode facing other electrode per unit volume of said cell to a total thickness of positive and negative electrodes is at least 250 cc$^{-1}$, (6) the number of laminations of said pair of electrodes is at least 10, (7) a negative electrode has a liquid retention rate of at least 0.8, the retention rate of the negative electrode having been measured relative to retention of propylene carbonate and dimethyl carbonate, (8) a positive electrode has a liquid retention rate of at least 0.8, the retention rate of the positive electrode having been measured relative to retention of propylene carbonate and dimethyl carbonate, (9) an average viscosity of a solvent of said electrolytic solution is at least 1 cp, and

(10) an amount of said electrolytic solution per unit internal volume of said cell is at last 0.2 and less than 0.4 cc/cc.

13. A layer built cell as in claim 7, wherein:

the O/C ratio is the ratio of a lipophilic group to carbon atoms.

14. A layer built cell as in claim 11, wherein:

the O/C ratio is the ratio of a lipophilic group to carbon atoms.

15. A layer built cell as in claim 12, wherein:

the O/C ratio is the ratio of a lipophilic group to carbon atoms.

16. The layer built cell according to claim 1, wherein:

an amount of said electrolytic solution per unit internal volume of said cell is from 0.2 to 0.25 cc/cc.

17. The layer built cell according to claim 2, wherein:

an amount of said electrolytic solution per unit internal volume of said cell is from 0.2 to 0.25 cc/cc.

18. The layer built cell according to claim 9, wherein:

an amount of said electrolytic solution per unit internal volume of said cell is from 0.2 to 0.25 cc/cc.

19. The layer built cell according to claim 15, wherein:

a peripheral length of an electrode facing other electrode per unit internal volume of said cell is at least 15 cm/cc.

* * * * *